US008898440B2

(12) United States Patent
Chang et al.

(10) Patent No.: US 8,898,440 B2
(45) Date of Patent: Nov. 25, 2014

(54) REQUEST CONTROL DEVICE, REQUEST CONTROL METHOD AND ASSOCIATED PROCESSORS

(75) Inventors: Xiao Tao Chang, Beijing (CN); Wei Liu, Beijing (CN); Kun Wang, Beijing (CN); Hong Bo Zeng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/858,588

(22) Filed: Aug. 18, 2010

(65) Prior Publication Data
US 2011/0055522 A1 Mar. 3, 2011

(30) Foreign Application Priority Data

Aug. 31, 2009 (CN) .......................... 2009 1 0171387

(51) Int. Cl.
*G06F 15/00* (2006.01)
*G06F 7/38* (2006.01)
*G06F 9/00* (2006.01)
*G06F 9/44* (2006.01)
*G06F 9/54* (2006.01)

(52) U.S. Cl.
CPC ..................................... *G06F 9/546* (2013.01)
USPC .......................................... 712/228; 712/216

(58) Field of Classification Search
None
See application file for complete search history.

(56) References Cited

U.S. PATENT DOCUMENTS

| 4,949,251 | A  | * | 8/1990 | Griffin et al. ................... 714/20 |
| 7,225,436 | B1 |   | 5/2007 | Patel |
| 7,340,495 | B2 |   | 3/2008 | Buxton |
| 7,434,043 | B2 |   | 10/2008 | Buer |
| 2004/0117801 | A1 |   | 6/2004 | Eibach et al. |
| 2004/0199594 | A1 | * | 10/2004 | Radatti et al. ................. 709/206 |
| 2005/0104753 | A1 |   | 5/2005 | Dror |
| 2006/0187823 | A1 | * | 8/2006 | Haag et al. .................... 370/229 |
| 2007/0016554 | A1 |   | 1/2007 | Dapp |
| 2008/0183688 | A1 |   | 7/2008 | Chamdani |
| 2008/0189251 | A1 |   | 8/2008 | Branscome |
| 2008/0189252 | A1 |   | 8/2008 | Branscome |

OTHER PUBLICATIONS

Watson et al. (Gaining Efficiency in Transport Services by Appropriate Design and Implementation Choices, May 1987, pp. 97-120).*

(Continued)

*Primary Examiner* — George Giroux
(74) *Attorney, Agent, or Firm* — Jon A. Gibbons; Fleit Gibbons Gutman Bongini & Bianco PL (57) ABSTRACT

A request control device, request control method, and a multiprocessor cooperation architecture. The request control device is connected to a request storage module and includes a comparing means and an identifier means. The comparing means is configured to determine if an incoming first queue unit corresponds to the same message with a queue unit that has existed in the request storage module. The identifier setting means is configured to set a save identifier of the queue unit that has existed in the request storage module to indicate not to save a state associated with the message if the first queue unit corresponds to the same message with the queue unit that has existed in the request storage module. According to the technical solution of the invention, the access to the memory caused by saving/loading the states is reduced and thereby increases the processing speed of the processor.

25 Claims, 8 Drawing Sheets (56) References Cited

OTHER PUBLICATIONS

R. Guha, et. al., "Resource management and task partitioning and scheduling on a run-time reconfigurable embedded system", Computers and Electrical Eng. 35 (2009), pp. 258-285.

S.H. Lee, et. al., "Implementation of H.264/AVC Decoder for Mobile Video Applications," ISCAS (2006), pp. 5587-5590.

C. Layer, "Efficient Hardware Search Engine for Associative Content Retrieval of Long Queries in Huge Multimedia Databases," ICME (2005), pp. 1034-1037.

F. Xia, et. al., "FPGA-Based Accelerators for BLAST Families with Multi-seeds Detection and Parallel Extension," Bioinformatics Research and Development (2008), pp. 43-57.

\* cited by examiner

REQUEST CONTROL DEVICE, REQUEST CONTROL METHOD AND ASSOCIATED PROCESSORS

CROSS-REFERENCE TO RELATED APPLICATIONS

This application claims priority under 35 U.S.C. §119 from Chinese Patent Application No. 200910171387.6, filed Aug. 31, 2009, the entire contents of which are incorporated herein by reference.

TECHNICAL FIELD OF THE INVENTION

The present invention relates to data processing, and more specifically, to a request control device, a request control method and associated processors.

DESCRIPTION OF THE RELATED ART

Common multiprocessor cooperation architectures use processors of different types. For example, a general purpose processor serves as a main processor and special purpose processors serve as coprocessors. The special purpose processors are specially optimized for some special applications such that they have higher performances than the general purpose processor when processing the special applications. The applications can be, for example, encryption/decryption, compression/decompression, encoding/decoding, pattern match or XML parsing and so on.

Figure 1:
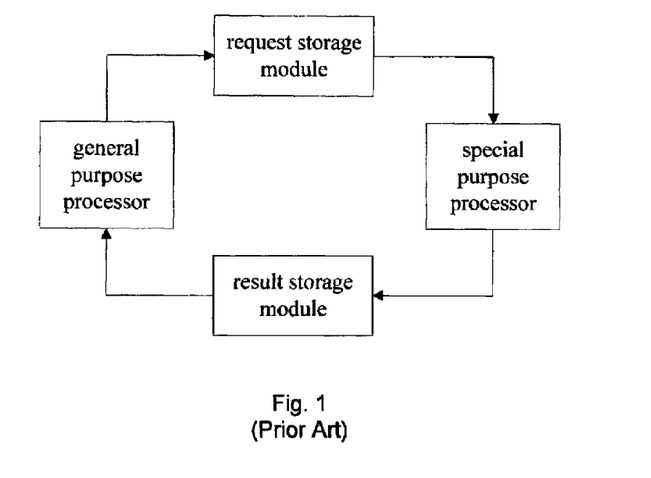
FIG. 1 shows a multiprocessor cooperation architecture according to the prior art.

FIG. 1 shows a schematic diagram of this architecture. The general purpose processor transmits data to be processed to the special purpose processor via a request storage module, and the special purpose processor transmits results obtained from the processing to the general purpose processor via a result storage module.

In a networking environment, an initial message is packed into a plurality of data packets at a transmitting end with each data packet including an initial message segment. The data packets are then transmitted to a receiving end over the network, and the initial message segments included in the data packets are combined at the receiving end to thereby restore the initial message.

Figure 2:
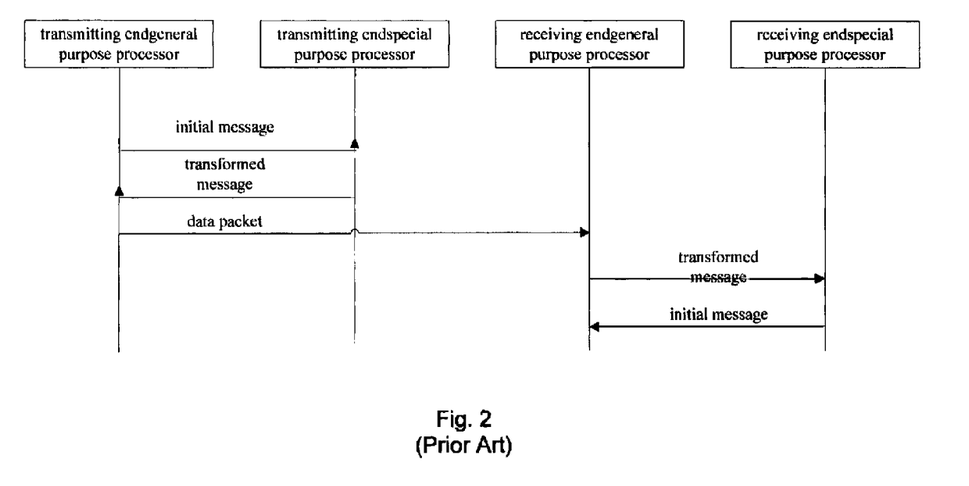
FIG. 2 shows a message transmitting-receiving flow in combination with preprocessing according to the prior art.

FIG. 2 shows a common message transmitting-receiving flow in combination with preprocessing. The flow shown in FIG. 2 illustrates a case where the transmitting end and the receiving end are required to perform symmetrical processing. As shown in FIG. 2, the general purpose processor at the transmitting end can leverage a special purpose processor at the transmitting end to preprocess the initial message, e.g., compressing or encrypting it, to form a transformed message. Then, the transformed message is divided into a plurality of transformed message segments to be packed into a plurality of data packets. The initial message and the transformed message are two forms of a same message. Due to instability of the networking environment, although the transmitting end transmits the plurality of data packets continuously, the receiving end may not receive the plurality of data packets continuously.

According to a solution called stateless processing, the general purpose processor at the receiving end can obtain a complete transformed message after it receives and unpacks all the data packets corresponding to the message, and the special purpose processor at the receiving end is then used for reversely processing the transformed message to thereby restore the initial message.

According to a solution called stateful processing, the general purpose processor at the receiving end can also transmit the transformed message segments included in a data packet to the special purpose processors at the receiving end to obtain the initial message segments each time the data packet is received and unpacked. Then, the initial message segments are combined after all the data packets corresponding to the message are received, unpacked, and reversely processed, to thereby restore the initial message.

At the receiving end, data packets corresponding to different messages may reach the receiving end interleaved with each other. In the case of stateful processing, the general purpose processor at the receiving end unpacks each message packet, packages the resulting transformed message segments into a queue unit according to a certain format and then places them into a primary request storage area of the special purpose processor. The primary request storage area may be a part of the request storage module. The special purpose processor needs to frequently save and load states associated with the messages while processing the queue units.

Figure 3:
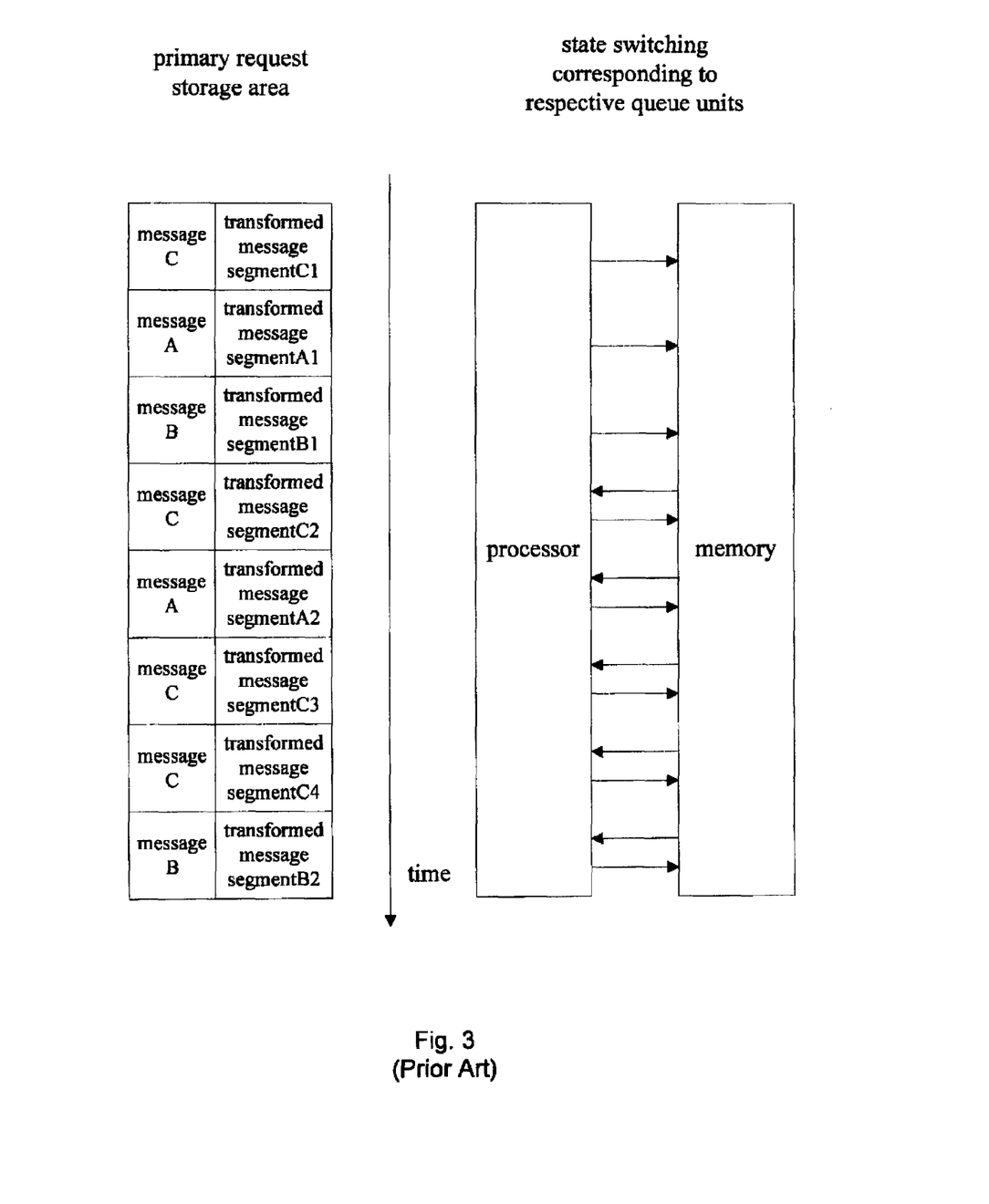
FIG. 3 shows a request storage module of a special purpose processor and corresponding state switching according to the prior art.

FIG. 3 shows examples of the primary request storage area of the special purpose processor and corresponding state switching.

As shown on the left side of FIG. 3, each row represents a queue unit including at least two contents: a first content is a message ID, and a second content is data to be processed or a pointer to the data. Transformed message segments corresponding to three messages are packaged in respective queue units of the primary request storage area, namely, transformed message segments of a message A, transformed message segments of a message B, and transformed message segments of a message C.

As shown in the right side of FIG. 3, after the processing a queue unit in which the transformed message segment C1 of the message C is packaged, a state associated with the message C shall be saved. When processing the queue unit in which the transformed message segment C2 of the message C is packaged, the state associated with the message C shall be loaded once again. To make matters worse, the special purpose processor does not know whether or not the successive two queue units correspond to the same message. Therefore, as shown in FIG. 3, each time a queue unit is processed, a state associated with the message corresponding to the queue unit needs to be saved, and each time a queue unit is prepared to be processed, the state needs to be loaded unless the state is not saved before.

The state may be saved in a cache of the special purpose processor to increase the speed of saving and loading the state. However, if a data amount of the state is too large, or if there are too many messages whose states need to be saved, or if a capacity of the cache is too small, then the state has to be saved in the memory. In this way, frequently saving and loading the state will result in frequent memory access and thereby greatly increase processing delay.

SUMMARY OF THE INVENTION

Accordingly, an aspect of the present invention provides a request control device connected to a request storage module that includes a comparing means and an identifier means. The comparing means is configured to determine if an incoming first queue unit corresponds to the same message with a queue unit that has existed in the request storage module. The identifier setting means is configured to set a save identifier of the queue unit that has existed in the request storage module to indicate not to save a state associated with the message if the first queue unit corresponds to the same message with the queue unit that has existed in the request storage module.

Another aspect of the present invention provides a multi-processor cooperation architecture including a request control device, a request storage module connected to the request control device, and a processor including an identifier reading means configured to determine whether or not to save the state associated with the message, after the queue unit that has existed in the request storage module is processed, according to the save identifier of the queue unit that has existed in the request storage module. The request control device includes (i) a comparing means configured to determine if an incoming first queue unit corresponds to the same message with a queue unit that has existed in the request storage module and (ii) an identifier setting means configured to set a save identifier of the queue unit that has existed in the request storage module to indicate not to save a state associated with the message if the first queue unit corresponds to the same message with the queue unit that has existed in the request storage module.

Another aspect of the present invention provides a request control method. It is determined if a first queue unit incoming to a request control means corresponds to a same message with a queue unit that has existed in a request storage module. If the determination is made, then a save identifier of the queue unit that has existed in the request storage module is set to indicate not to save a state associated with the message.

According to the technical solution of the invention, access to the memory caused by saving/loading the states is reduced and thereby increases the processing speed of the processor.

DETAILED DESCRIPTION OF THE PREFERRED EMBODIMENT

Preferred embodiments of the processor of the invention and a method of scheduling the processor are described below with reference to the accompanying drawings.

According to an embodiment of the invention, if an incoming first queue unit corresponds to the same message as a second queue unit that has existed in the request storage module, then the save identifier of the second queue unit is set to indicate not to save the state associated with the message. As a result, the processor does not save the state after the second queue unit is processed and a number of memory accesses is thereby reduced. In the following description, comparing if a first queue unit corresponds to the same message as a second queue unit can be made by directly comparing if the message corresponding to the first queue unit is the same as the message corresponding to the second queue unit. If it is determined that a third queue unit corresponds to the same message as the second queue unit, then comparing if the first queue unit corresponds to the same message as the second queue unit can be made by comparing if the message corresponding to the first queue unit is the same as the message corresponding to the third queue unit.

Figure 4A:
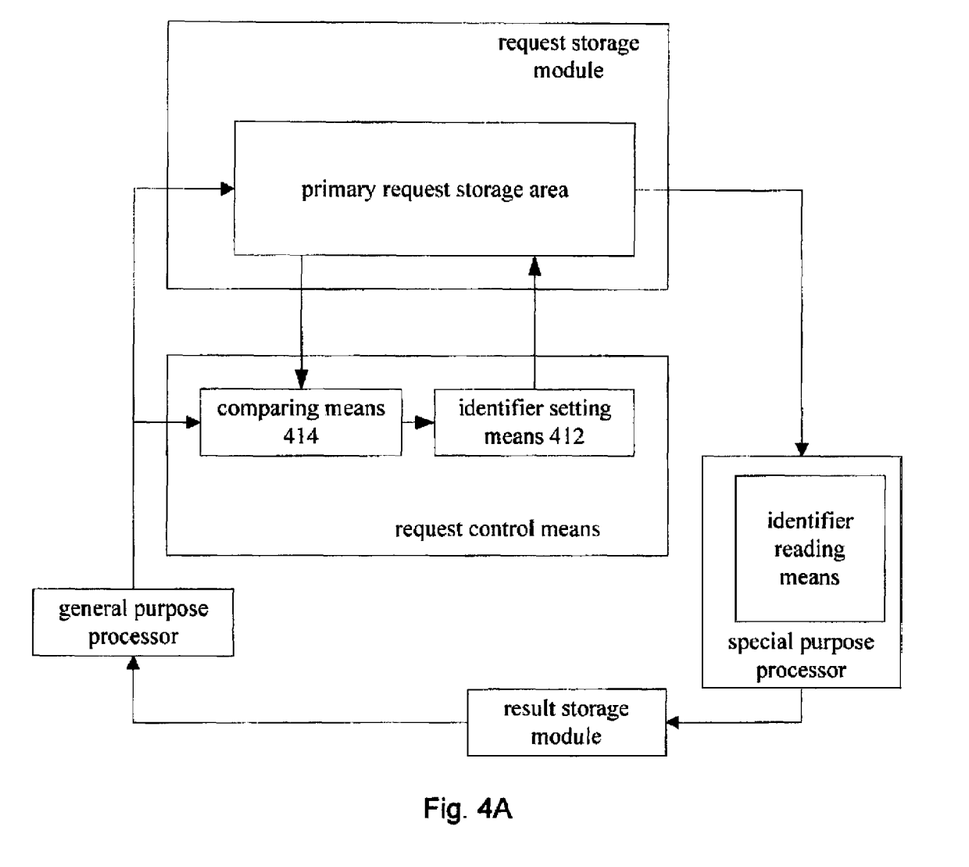
FIG. 4A shows a multiprocessor cooperation architecture according to an embodiment of the invention.

FIG. 4A shows a multiprocessor cooperation architecture according to an embodiment of the invention. As described above with reference to FIG. 3, the special purpose processor does not know whether or not two successive queue units correspond to the same message, so each time a queue unit is processed it has to save the state associated with the message corresponding to the queue unit, and each time a queue unit is prepared to be processed it has to load the state, unless the state was not saved before. According to the architecture as shown in FIG. 4A, the special purpose processor may be notified of whether or not the two successive queue units correspond to the same message.

As shown in FIG. 4A, the general purpose processor communicates with the special purpose processor via a primary request storage area and a result storage module. As shown, the primary request storage area is a part of the request storage module. Those skilled in the art could set forms of the request storage module and the result storage module as needed, for example, they can be implemented in the memory as logic queues or can be implemented in the general purpose processor or special purpose processor located in the chip as physical queues. If the general purpose processor and the special purpose processor are located in different chips, the request storage module or result storage module may be provided in the same chip with the general purpose processor, or may be provided in the same chip with the special purpose processor. In the case where the general purpose processor and the special purpose processor are different units in the same chip, the request storage module or result storage module is a particular unit in the chip. The comparing means 414 and the identifier setting means 412 are parts of the request control means, and preferably are located in the same device as the primary request storage area.

The comparing means 414 in FIG. 4A determines if the incoming first queue unit corresponds to the same message as the second queue unit which entered the primary request storage area previously. If it is determined that the first queue unit corresponds to the same message as the second queue unit, then the identifier setting means 412 sets the save identifier of the second queue unit according to a result of the determination. In this way, when the special purpose processor processes the second queue unit, it is known that the first queue unit, which is to be processed subsequent to the second queue unit, corresponds to the same message by reading the save identifier through the identifier reading means, thus it is not necessary to save the state.

The data structure of the queue unit according to the embodiment includes a message ID for indicating which message the queue unit corresponds to. The comparing means 414 can determine if two queue units correspond to the same message by comparing message IDs of the two queue units. The queue unit further includes a save identifier for indicating whether or not the special purpose processor needs to save the state after processing the current queue unit. A default value of the save identifier may be set to indicate the need to save the state. In this way, only when the comparing means 414 determines that the first queue unit and the second queue unit correspond to the same message will the identifier setting means 412 set the value of the save identifier to indicate no need to save the state. Other contents included in the data structure of the queue unit are common knowledge in the art and thus are omitted here.

The comparing operation and the identifier setting operation may be executed in parallel with the operation of entering the first queue unit into the primary request storage area. The process of putting a new queue unit in a queue is common knowledge in the art and thus is omitted here.

The request storage module and the result storage module are preferably implemented as physical queues. This is because comparison and modification to the data in the memory requires accesses to the memory and thereby increase the processing time. However, when implemented as physical queues, the comparing means 414 and the identifier setting means 412 can be implemented by a simple combination circuit that not only increases the processing speed but also reduces processing complexity. For example, the comparing means 414 may be implemented by an "exclusive or" circuit, where "1" outputs when the two message IDs are the same and "0" outputs when the two message IDs are different from each other. Provided that the default value of the save identifier is 0, it is enough that the identifier setting means 412 writes the output of the comparing means 414 to the save identifier of the second queue unit.

If the general purpose processor and the special purpose processor are located in different chips, then the request storage module or result storage module may be located in the same chip with the general purpose processor, or located in the same chip with the special purpose processor. In the case where the general purpose processor and the special purpose processor are different units in the same chip, then the request storage module or result storage module may be particular units in the chip.

Figure 4B:
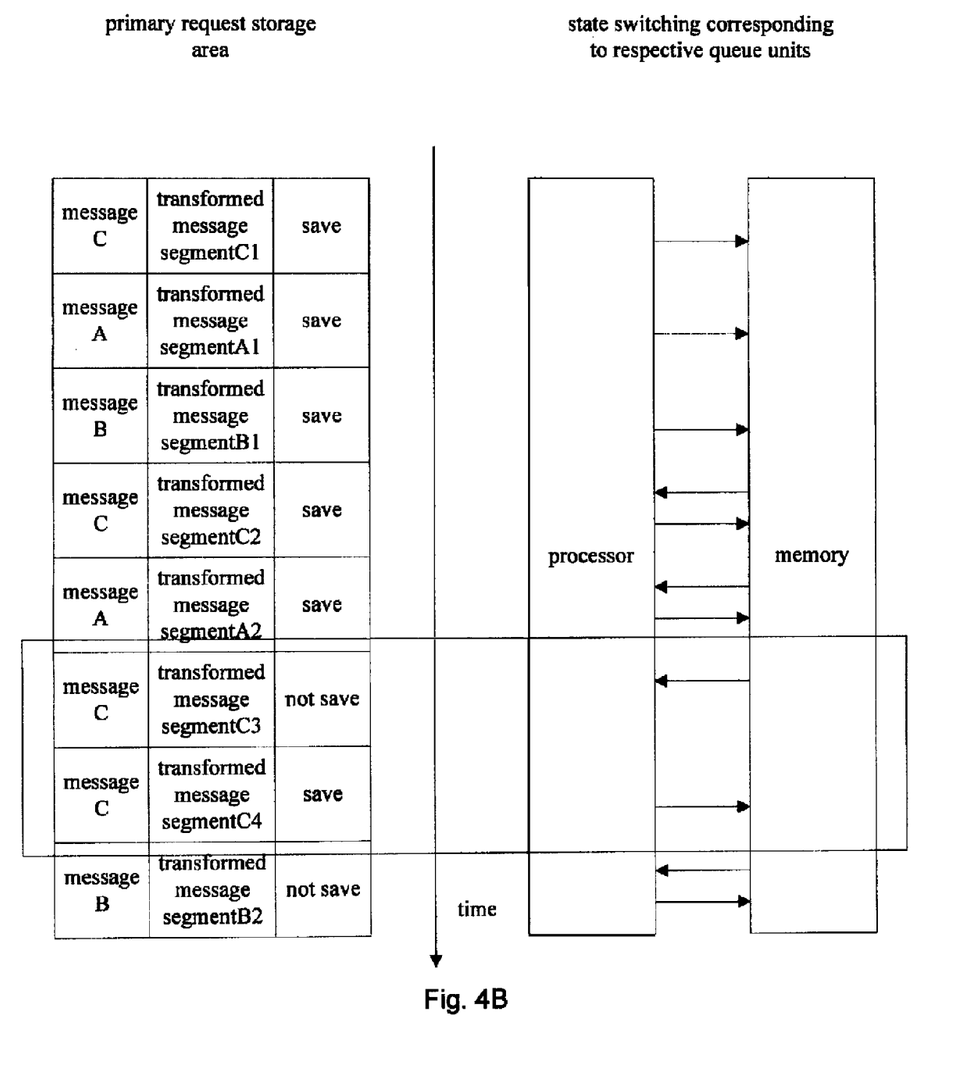
FIG. 4B shows a request storage module of a special purpose processor and corresponding state switching, according to the embodiment shown in FIG. 4A.

FIG. 4B shows the primary request storage area of the special purpose processor and corresponding state switching, according to the embodiment of FIG. 4A. Those skilled in the art will appreciate that the case shown in FIG. 4B represents when the special purpose processor processes a queue unit rather than when the queue unit arrives at the request control device. In the left side of FIG. 4B, each row represents a queue unit, and each queue unit includes at least three portions. The first portion is a message ID, the second portion is the data to be processed or a pointer to the data, and the third portion is the save identifier.

Referring to the section surrounded by a solid box, when the queue unit containing the transformed message segment C4 of the message C enters the primary request storage area, the identifier setting means 412 sets the save identifier of the queue unit containing transformed message segment C3 of the message C to indicate not to save the state. Although in FIG. 4B the queue unit containing the transformed message segment C3 of the message C and the queue unit containing the transformed message segment C4 of the message C are located in the middle of the queue rather than in the end of the queue, those skilled in the art will appreciate that at the time when the queue unit containing the transformed message segment C4 of the message C comes, the queue unit containing the transformed message segment C3 of the message C is located in the end of the queue. After the special purpose processor processes the queue unit containing the transformed message segment C3 of the message C, the state is not saved and the access to the memory is eliminated.

Figure 5A:
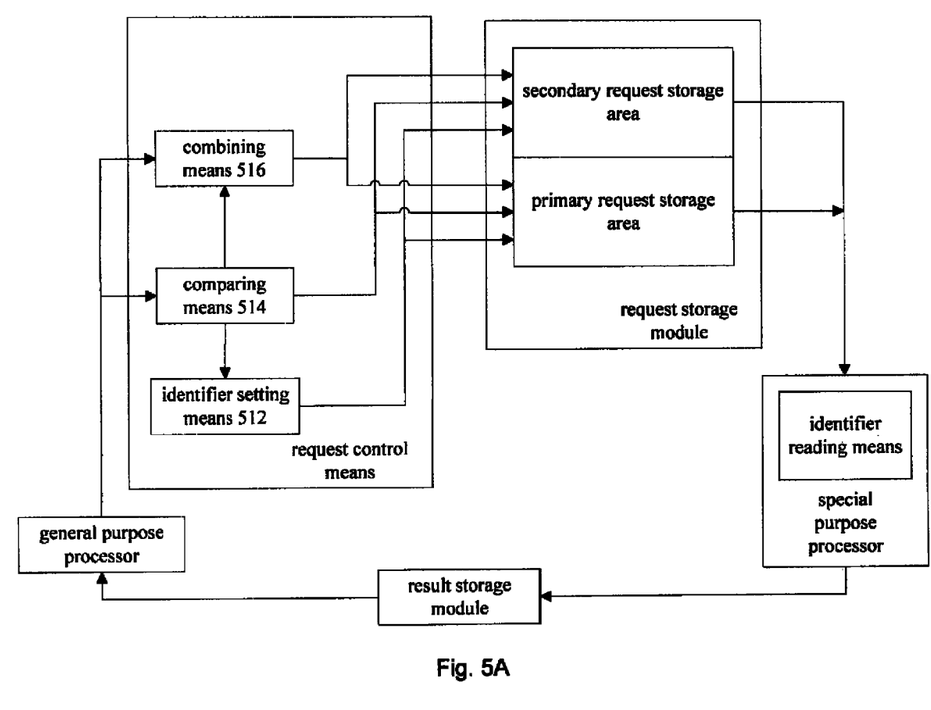
FIG. 5A shows a multiprocessor cooperation architecture according to another embodiment of the invention.
Figure 6A:
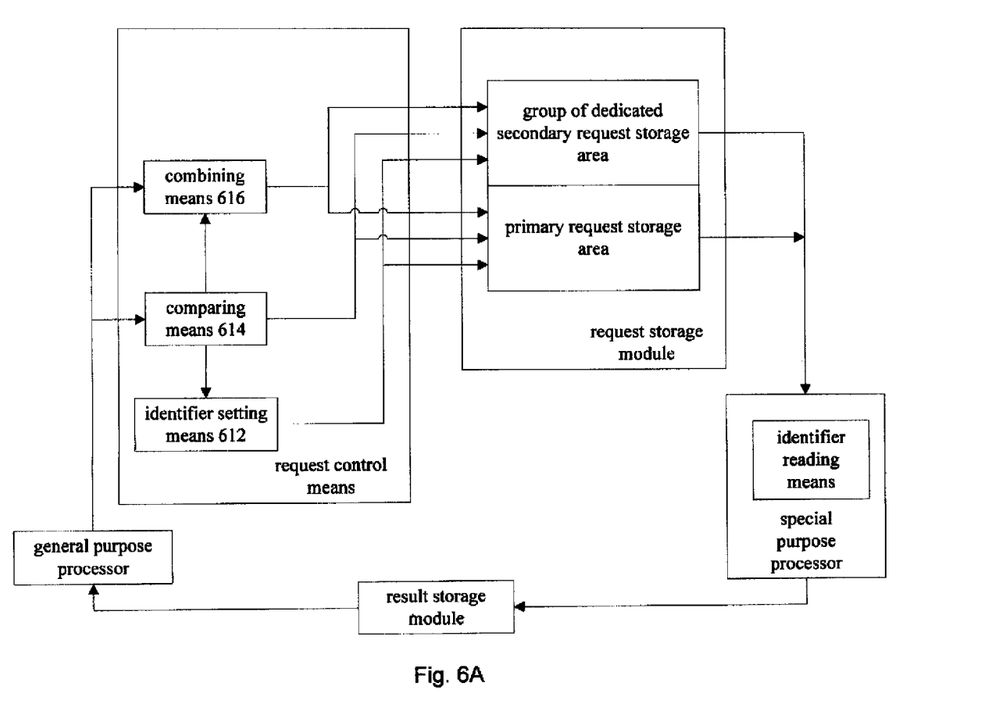
FIG. 6A shows a multiprocessor cooperation architecture according to a further embodiment of the invention.

FIGS. 5A and 6A show a multiprocessor cooperation architecture according to two other embodiments of the invention.

In the architecture shown in FIGS. 5A and 6A, a secondary request storage area is provided in the request storage module, thus saving of the state is reduced for those queue units that are not at the end of the queue. The comparing means 514 determines if the incoming first queue unit corresponds to the same message as the queue unit in the request storage module. The architecture shown in FIG. 5A further includes a combining means 516. If the first queue unit corresponds to the same message as the queue unit in the request storage module, the combining means 516 is notified to put the first queue unit in the secondary request storage area, and the identifier setting means is notified to set the save identifier of the queue unit that corresponds to the same message as the first queue unit to indicate not to save the state associated with the message.

The data structure of the queue units in the secondary request storage area is not required to be identical with the data structure of the queue units in the primary request storage area but, for sake of simplicity, the description below describes the case where the data structure of the queue units in the secondary request storage area is identical with the data structure of the queue units in the primary request storage area.

In the embodiment shown in FIG. 5A, the secondary request storage area is shared by basic hardware storage units in the primary request storage area. Each of the basic hardware storage units in the primary request storage area or secondary request storage area are used for storing a queue unit. The secondary request storage area is shared by the basic hardware storage units, which shows that the secondary request storage area can store those queue units that correspond to the same message as a queue unit stored in any of the basic hardware storage units in the primary request storage area. In this case, the comparing means 514 may determine that the secondary request storage area is empty and that the incoming first queue unit corresponds to the same message as any of the queue units that exist in the request storage module. Hereinafter referred to as condition (1).

If the comparing means 514 determines that the incoming first queue unit corresponds to the same message as a third queue unit that has existed in the request storage module, then the identifier setting means 512 sets the save identifier of the third queue unit to indicate that there is no need to perform the saving operation. If the data structure of the queue units in the primary request storage area is identical with that of the queue units in the secondary request storage area, then the combining means 516 puts the first queue unit in the secondary request storage area in response to the determination by the comparing means 514 that the first queue unit and the third queue unit correspond to the same message. If the data structure of the queue units in the primary request storage area is not identical with that of the queue units in the secondary request storage area, then after formatting the first queue unit, the combining means 516 puts the first queue unit in the secondary request storage area according to the data structure of the queue units in the secondary request storage area. If the first queue unit does not correspond to the same message as any of the queue units in the primary request storage area, then the combining means 516 puts the first queue unit at the end of the queue of the primary request storage area. Those skilled in the art would appreciate that, if the third queue unit is located at the end of the queue of the primary request storage area, then the first queue unit can be put in the secondary request storage area or the first queue unit can be put in the primary request storage area.

When the special purpose processor processes the third queue unit, it knows the first queue unit to be processed subsequently corresponds to the same message by reading the save identifier using the identifier reading means and therefore the state is not saved. The special purpose processor also knows from the save identifier that the first queue unit is located in the secondary request storage area and thus, after the third queue unit is processed, the queue units following the third queue unit are not read from the primary request storage area, but rather the queue units following the third queue unit are read from the secondary request storage area.

Alternatively, the comparing means may determine that the secondary request storage area is not empty and that the incoming first queue unit corresponds to the same message with the queue units in the secondary request storage area. Hereinafter referred to a condition 2.

If the comparing means 514 finds that the secondary request storage area is not empty and that the incoming first queue unit corresponds to the same message as a queue unit in the secondary request storage area, then the combining means 516 puts the first queue unit in the secondary request storage area or puts the formatted first queue unit in the secondary request storage area, and the identifier setting means 512 sets the save identifier of a last queue unit, referred to as a fourth queue unit, in the secondary request storage area to indicate not to save the state. If the first queue unit and the queue unit in the secondary request storage area correspond to different messages then the combining means 516 puts the first queue unit at the end of the primary request storage area.

When the special purpose processor processes the fourth queue unit in the secondary request storage area, it knows the first queue unit to be processed subsequently corresponds to the same message by reading the save identifier using the identifier reading means and thus the state is not saved. The special purpose processor also knows from the save identifier that the first queue unit is located in the secondary request storage area. Thus, after the fourth queue unit is processed, the queue units following the fourth queue unit are not read from the primary request storage area but rather the queue units following the fourth queue unit are read from the secondary request storage area.

Those skilled in the art would appreciate that, for sake of simplicity, the comparing means 514 can only determine if condition (1) is established or condition (2) is established. If the condition (1) is established, the identifier setting means 512 is notified of setting the save identifier of the third queue unit to indicate no need to perform the saving operation, and the combining means 516 is notified of putting the first queue unit in the secondary request storage area. If the condition (2) is established, the combining means 516 is notified of putting the first queue unit in the secondary request storage area, and the identifier setting means 512 is notified of setting the save identifier of the last queue unit, i.e. the fourth queue unit, in the secondary request storage area to indicate not to save the state. Those skilled in the art could design more determination and control logics for the architecture in which the common secondary request storage area is provided.

The case where the data structure of the queue units in the secondary request storage area is not identical with the data structure of the queue units in the primary request storage area arises because the queue units in the secondary request storage area are a simplified version of the queue units in the primary request storage area. For example, the data structure of the queue units in the primary request storage area can comprise control marks, such as Quality of Service (QoS), for guiding an operation of the special purpose processor. If the control marks maintain unchanged for a particular message, then the combining means 516 could peel the control marks off the first queue unit and then put the first queue unit in the secondary request storage area.

In a hardware design, in view of the capacity of the hardware, the secondary request storage area can be designed with only one unit hardware storage unit. In other words, the secondary request storage area can be designed as only accommodating a queue unit at the same time. In this case, after the first queue unit put in the secondary request storage area is processed by the special purpose processor, the state associated with the queue unit is saved and then the next queue unit is read from the head of the queue in the primary request storage area regardless of the value of the save identifier. That is to say, the combining means 516 can further peel the save identifier off the data structure of the first queue unit.

Figure 5B:
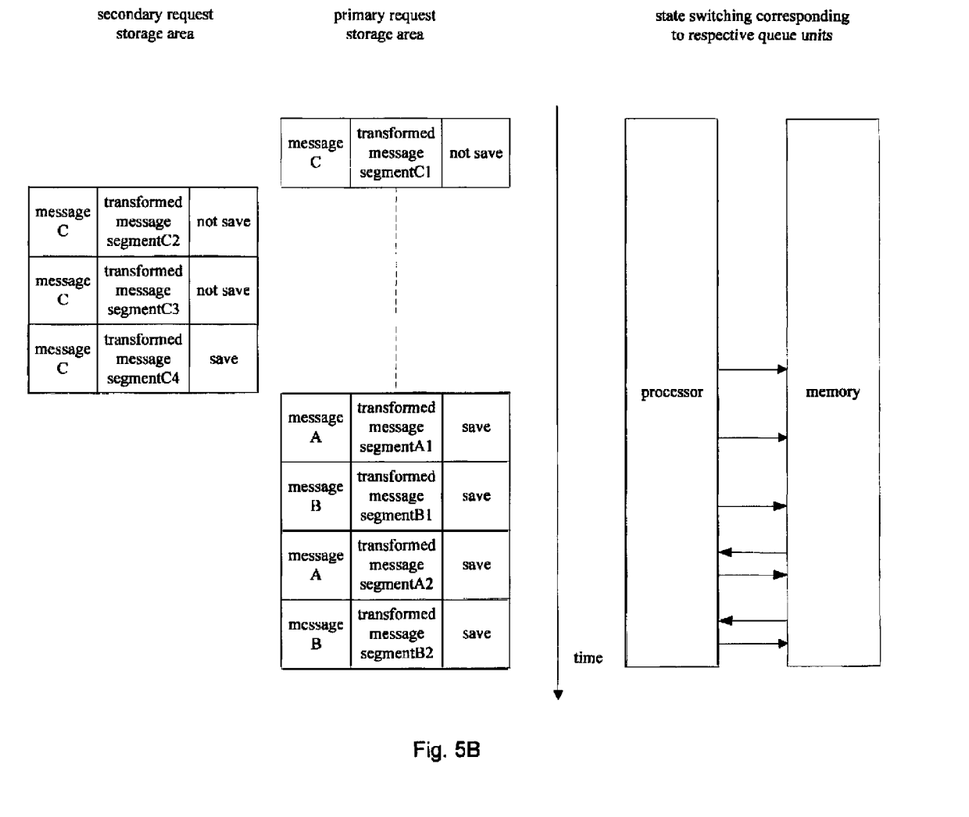
FIG. 5B shows a request storage module of a special purpose processor and corresponding state switching, according to the embodiment shown in FIG. 5A.

FIG. 5B shows the primary request storage area and secondary request storage area of the special purpose processor and corresponding state switching in the case where the secondary request storage area can accommodate a plurality of queue units at the same time, that is, with a plurality of basic hardware storage units. Those skilled in the art will appreciate that FIG. 5B shows the case where the processor processes the queue unit rather than the case where the queue unit comes. The dashed line shows that two connected queue units are adjacent to each other in physical location but are isolated from each other in processing time. For the sake of simplicity, FIG. 5B shows that the queue units in the secondary request storage area have a data structure identical with that of the queue units in the primary request storage area.

The primary request storage area and the secondary request storage area shown in FIG. 5B are formed as follows. The order of the queue units issued by the general purpose processor is identical with that shown in FIGS. 3 and 4B, so the queue unit containing the transformed message segment C1 of the message C, the queue unit containing the transformed message segment A1 of the message A, and the queue unit containing the transformed message segment B1 of the message B enter the queue unit in this order.

According to the embodiment of the invention shown, when the queue unit containing the transformed message segment C2 of the message C comes, the comparing means 514 determines that condition (1) is satisfied and the combining means 516 puts the queue unit in the secondary request storage area. Before the queue unit containing the transformed message segment C2 of the message C is fetched by the special purpose processor from the secondary request storage area for processing, the queue unit containing the transformed message segment A2 of the message A comes. At this time, since the queue unit corresponding to the message C has been put in the secondary request storage area, i.e. the comparing means 514 determines that neither of condition (1) and condition (2) is satisfied, the queue unit containing the transformed message segment A2 of the message A can only be put in the primary request storage area. Thereafter, but still before the queue unit in which the transformed message segment C2 of the message C is packaged is fetched by the special purpose processor from the secondary request storage area for processing, the queue unit containing the transformed message segment C3 of the message C and the queue unit containing the transformed message segment C4 of the message C come in order. According to the embodiment of the invention shown, the comparing means 514 determines that the condition (2) is satisfied and the combining means 516 puts them in the secondary request storage area and correspondingly sets the associated save identifier. Before the queue unit containing the transformed message segment C4 of the message C is fetched by the special purpose processor from the secondary request storage area for processing, the queue unit containing the transformed message segment B2 of the message B comes. At this time, since the queue unit corresponding to the message C has been put in the secondary request storage area, i.e. the comparing means 514 determines that neither of the condition (1) and condition (2) is satisfied, the queue unit in which the transformed message segment B2 of the message B is packaged can only be put in the primary request storage area.

The embodiment in FIG. 5A and FIG. 5B further reduces the number of states being saved/loaded compared to the embodiment shown in FIG. 4A and FIG. 5B.

According to an embodiment, a secondary request storage area group including more than two secondary request memories may be provided. In general, the number of the secondary request memories does not exceed the total number of the queue units that can be accommodated in the primary request storage area at the same time, i.e., does not exceed the total number of the basic hardware storage units in the primary request storage area.

FIG. 6A shows a multiprocessor cooperation architecture according to a further embodiment of the invention.

In the embodiment shown in FIG. 6A, a special purpose secondary request storage area is provided for one or more of basic hardware storage units in the primary request storage area. A secondary request storage area corresponds to or is dedicated to one unit hardware storage unit in the primary request storage area and the secondary request storage area can only store those queue units that correspond to the same message with the queue units stored in the basic hardware storage units of the primary request storage area. The following description mentions that a queue unit is provided with a secondary request storage area or corresponds to a secondary request storage area, which means that the unit hardware storage unit where the queue unit is located is provided with a secondary request storage area or corresponds to a secondary request storage area.

Likewise, the data structure of the queue units in the secondary request storage area does not need to be identical with that of the queue units in the primary request storage area. However, for sake of simplicity, the following description only describes the case where the data structure of the queue units in the secondary request storage area is identical with that of the queue units in the primary request storage area.

The comparing means 614 determines if the incoming first queue unit corresponds to the same message with any of the queue units that have existed in the primary request storage area and are provided with a secondary request storage area. If the comparing means 614 determines that the incoming first queue unit corresponds to the same message with any of the queue units, referred to as a fifth queue unit, that have existed in the primary request storage area and are provided with a secondary request storage area, then combining means 616 puts the first queue unit in the secondary request storage area corresponding to the fifth queue unit. Those skilled in the art will appreciate that the fifth queue unit may be located in the end of the queue of the primary request storage area. The identifier setting means 612 correspondingly performs an identifier setting operation, in other words, if the first queue unit is a queue unit that first enters the secondary request storage area corresponding to the fifth queue unit, i.e., the secondary request storage area is empty when the first queue unit comes, then the identifier setting means 612 sets the save identifier of the fifth queue unit. If the first queue unit is not a queue unit that first enters the secondary request storage area corresponding to the fifth queue unit, i.e., the secondary request storage area is not empty when the first queue unit comes, then the identifier setting means 612 sets the save identifier of the queue unit which enters the secondary request storage area corresponding to the fifth queue unit immediately before the first queue unit. Those skilled in the art will appreciate that, if the fifth queue unit is in the end of the queue of the primary request storage area, then the first queue unit may be put in the secondary request storage area that corresponds to the unit hardware storage unit where the fifth queue unit is located or may be put in the primary request storage area.

Figure 6B:
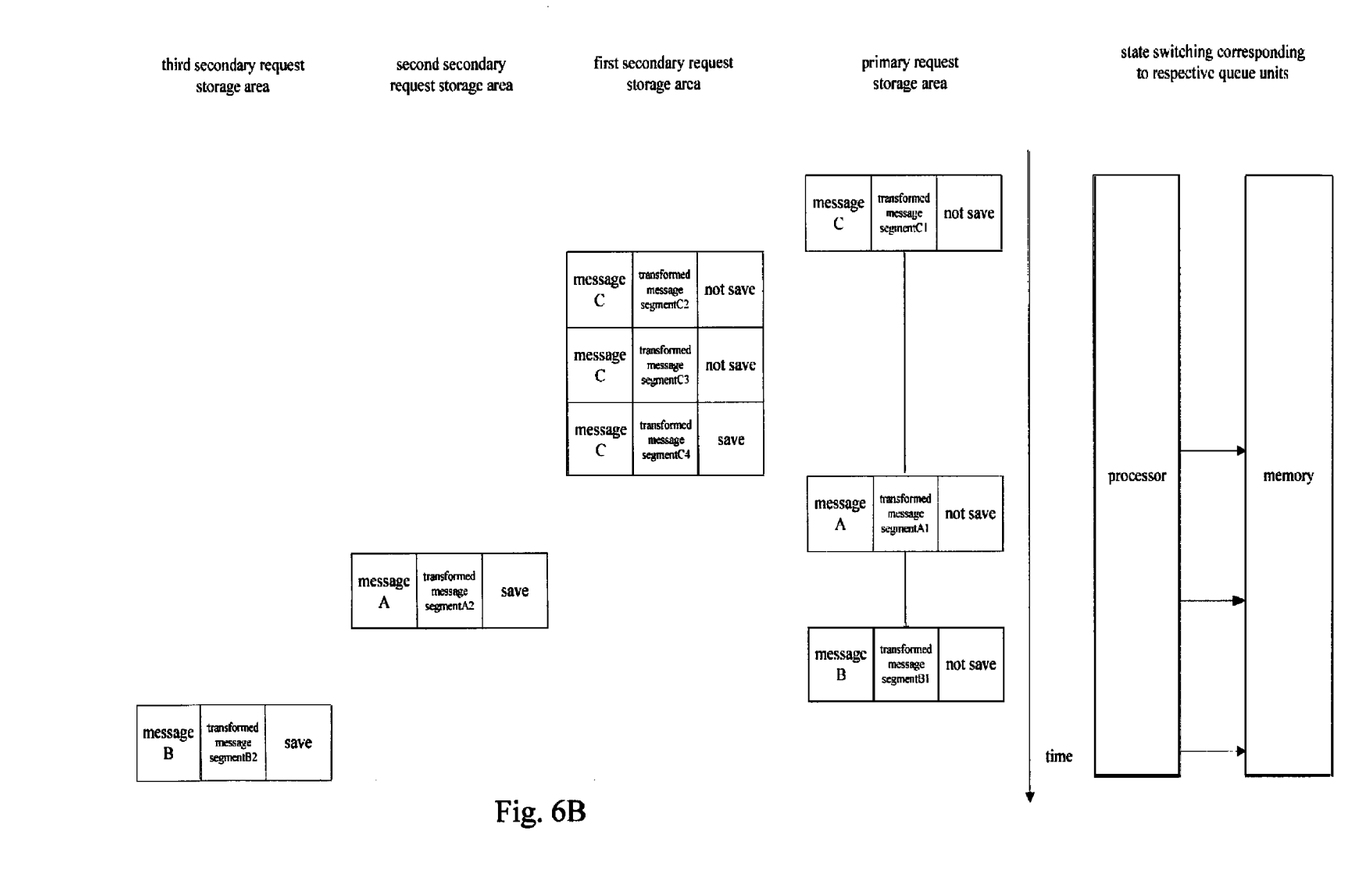
FIG. 6B shows a request storage module of a special purpose processor and corresponding state switching, according to the embodiment shown in FIG. 6A.

FIG. 6B shows the primary request storage area and secondary request storage area of the special purpose processor and corresponding state switching in the case where each of the queue units in the primary request storage area is provided with a secondary request storage area. The dashed lines show that two connected queue units are adjacent to each other in physical location but are isolated from each other in processing time. Those skilled in the art will appreciate that FIG. 6B shows the case where the processor processes the queue unit rather than the case where the queue unit comes. For sake of simplicity, FIG. 6B shows that the queue units in the secondary request storage area have a data structure identical with that of the queue units in the primary request storage area.

The primary request storage area and the secondary request storage area shown in FIG. 6B are formed as follows. The order of queue units issued by the general purpose processor is identical with that shown in FIGS. 3, 4B and 5B. Accordingly, the queue unit containing the transformed message segment C1 of the message C, the queue unit containing the transformed message segment A1 of the message A, and the queue unit containing the transformed message segment B1 of the message B enter the queue unit in this order. When the queue unit containing the transformed message segment C2 of the message C comes, the combining means 616 puts it in the first secondary request storage area, i.e. the secondary request storage area corresponding to queue unit containing the transformed message segment C1 of the message C, and the identifier setting means 612 sets the save identifier of the queue unit containing the transformed message segment C1 of the message C to indicate not to save the state. When the queue unit containing the transformed message segment A2 of the message A comes, the combining means 616 puts it in the second secondary request storage area, i.e. the secondary request storage area corresponding to the queue unit containing the transformed message segment A1 of the message A, and the identifier setting means 612 sets the save identifier of the queue unit containing the transformed message segment A1 of the message A to indicate not to save the state. The queue unit containing the transformed message segment C3 of the message C and the queue unit containing the transformed message segment C4 of the message C come in order and the combining means 616 puts it in the first secondary request storage area and correspondingly sets the associated save identifier. When the queue unit containing the transformed message segment B2 of the message B comes, the combining means 616 puts it in the third secondary request storage area, i.e. the secondary request storage area corresponding to the queue unit containing the transformed message segment B1 of the message B.

The embodiment in FIG. 6A and FIG. 6B further reduces the number of states being saved/loaded compared to the embodiment shown in FIG. 5A and FIG. 5B.

Referring to the primary request storage area and secondary queue in FIGS. 5B and 6B, if queue units corresponding to the message C continuously enter the secondary request storage area shown in FIG. 5B or the first secondary request storage area in FIG. 6B, then queue units corresponding to message A and message B cannot be processed. To overcome this problem, a counter may be provided in the request control device to check whether or not the number of queue units that are continuously put in a secondary request storage area and correspond to the same message exceeds a first threshold value. If the number exceeds the first threshold value, even if the comparing means finds that the incoming first queue unit corresponds to the same message with a queue unit that has existed in the primary request storage area or in the secondary request storage area, then the combining means still puts the first queue unit in the end of the queue of the primary request storage area.

For example, referring to FIGS. 5B and 6B, if the first threshold value is 3 and there comes again a queue unit corresponding to the message C, then the combining means puts it in the end of the queue of the primary request storage area and the identifier setting means does not perform the corresponding identifier setting operation.

A control method for the request storage module according to an embodiment of the invention is also described below. An incoming first queue unit is compared with a queue unit that has existed in the request storage module to determine if they correspond to the same message. If the first queue unit corresponds to same message with the queue unit that has existed in the request storage module, then a save identifier of the queue unit that has existed in the request storage module is set to indicate not to save a state associated with the message.

If the request storage module includes only the primary request storage area but does not include the secondary request storage area, then the step of comparing if the incoming first queue unit corresponds to the same message with the queue unit that has existed in the request storage module includes comparing if the incoming first queue unit corresponds to same message with a second queue unit in the end of the queue of the primary request storage area, and the step of setting a save identifier of the queue unit that has existed in the request storage module to indicate not to save a state associated with the message including setting the save identifier of the second queue unit to indicate not to save the state associated with the message.

If the request storage module includes not only the primary request storage area but also the secondary request storage area, then the above control method further includes the step of putting the first queue unit in the secondary request storage area.

The secondary request storage area may be in common use, or may be a special purpose secondary request storage area corresponding to at least one unit hardware storage unit in the primary request storage area. If the secondary request storage area is in common use, then the step of comparing if the first queue unit corresponds to the same message with the queue unit in the request storage module includes comparing if the first queue unit corresponds to the same message with any of a third queue unit in the primary request storage area in the case where the secondary request storage area is empty. Further, the step of setting a save identifier of the queue unit that has existed in the request storage module and that corresponds to the same message with the first queue unit to indicate not to save a state associated with the message includes setting a save identifier of the third queue unit to indicate not to save the state associated with the message.

Alternatively, if the secondary request storage area is in common use, then the step of comparing if the first queue unit corresponds to the same message with the queue unit in the request storage module includes comparing if the first queue unit corresponds to the same message with a fourth queue unit in the end of the queue of the secondary request storage area in the case where the secondary request storage area is not empty. Further, the step of setting a save identifier of the queue unit that has existed in the request storage module and that corresponds to the same message with the first queue unit, to indicate not to save a state associated with the message includes setting a save identifier of the fourth queue unit to indicate not to save the state associated with the message.

If the secondary request storage area is a special purpose secondary request storage area corresponding to at least one unit hardware storage unit in the primary request storage area, then the step of comparing if the first queue unit corresponds to the same message with the queue unit in the request storage module includes comparing if the first queue unit corresponds to the same message with any of a fifth queue unit provided with a secondary request storage area, in the primary request storage area. Further, the step of putting the first queue unit in the secondary request storage area includes putting the first queue unit in the secondary request storage area corresponding to the fifth queue unit.

If the secondary request storage area corresponding to the fifth queue unit is empty when the first queue unit comes, then the save identifier of the fifth queue unit is set to indicate not to save the state associated with the message. If the secondary request storage area corresponding to the fifth queue unit is not empty when the first queue unit comes, then the save identifier of the queue unit in the end of the queue of secondary request storage area corresponding to the fifth queue unit is set to indicate not to save the state associated with the message.

Optionally, it can be further checked whether or not the number of queue units that are continuously put in a secondary request storage area and correspond to the same message exceeds a first threshold value. Only when the number does not exceed the first threshold value is the save identifier of the queue unit that corresponds to the same message with the first queue unit in the request storage module set and the first queue unit is put in the secondary request storage area.

The save identifier of the queue unit can be realized by data flag bits in the data structure of the queue unit, or by hardware flag bits one-to-one corresponding to the unit hardware storage unit in the primary request storage area. All the queue units that need to save their states may be located in a queue, and all the queue units that need not to save their states may be located in another queue, then an ID of the queue may be regarded as the save identifier. Those skilled in the art could realize the save identifier of the queue unit in many ways.

The preferred embodiments of the invention are described above by referring to the architecture of the general purpose processor and the special purpose processor. In this architecture, the special purpose processor, as a coprocessor, performs certain data processing upon a request from a general purpose processor as a main processor, and sends processing results to the general purpose processor. Those skilled in the art would appreciate that, the invention can be applied to other architecture. For example, at least two processors in the architecture may be general purpose processors, in which at least one processor is a main processor and the other is a coprocessor. In this architecture, the main processor and coprocessor are relative to each other and even can be interconverted, so the request storage module shall be regarded as a unit that is used by a party needing to save state to receive data. Those skilled in the art will further appreciate that the main processor and the coprocessor may be different processor chips or may be different units in the same chip.

Those skilled in the art would appreciate that, the above method and system may be implemented by computer executable instructions and/or control codes contained in the processor, for example, such codes are provided in a carrier medium such as magnetic disk, CD or DVD-ROM, a programmable memory such as a read-only-memory (firmware) or a data carrier such as an optical or electronic signal carrier. The system for controlling energy consumption of a mobile device in the embodiment and components thereof may be implemented by hardware circuits such as large scale integrated circuit or gate array, semiconductor such as logic chip or transistor, or programmable hardware device such as field programmable gate array or programmable logic device, or be implemented by software executable by various types of processors, or by the combination of the hardware circuits and software, e.g. firmware.

Though the various exemplary embodiments of the invention have been illustrated and described, those skilled in the art would appreciate that, modification to the embodiments may be made without departing from the scope and sprits of the invention. The scope of the invention is defined only by the claims and equivalents thereof.

What is claimed is:

1. A request control device comprising:
    a processor for processing a plurality of messages, each message including a plurality of queue units, each message having a state associated with processing of the message, the state being dependent upon processing of the queue units of the corresponding message, each queue unit having a save identifier that indicates whether to save the state associated with processing of its corresponding message;
    at least one memory storage location, coupled to the processor, each storage location for selectively storing the state associated with processing of each message;
    a request storage module, coupled to the processor, for storing queue units; and
    a request control means, coupled to the processor, for receiving a plurality of incoming queue units, the request control means including:
        a comparing means for comparing a message corresponding to an incoming queue unit and a message corresponding to a queue unit that is pre-existing in the request storage module, and
        an identifier setting means configured to set the save identifier of the queue unit that is pre-existing in the request storage module to indicate not to save the state associated with the message corresponding to the queue unit that is pre-existing in the request storage module if the incoming queue unit and the queue unit that is pre-existing in the request storage module correspond to a same message,
    wherein the request control device uses the state associated with processing of the message so that processing of the message can be resumed from a same point at a later time during state switching of the processor.

2. The request control device of claim 1, wherein
    the request storage module comprises a primary request storage area; and
    the comparing means is configured to determine if the incoming queue unit corresponds to the same message as a second queue unit at an end of a queue of the primary request storage area; and
    the identifier setting means is configured to set a save identifier of the second queue unit to indicate not to save the state associated with the message if the incoming queue unit and the second queue unit correspond to the same message.

3. The request control device of claim 1,
    wherein the request storage module comprises a primary request storage area and a secondary request storage area; and
    the request control means further comprises a combining means configured to put the incoming queue unit in the secondary request storage area if the incoming queue unit corresponds to the same message as the queue unit that is pre-existing in the request storage module.

4. The request control device of claim 3, wherein the secondary request storage area is shared by basic hardware storage units in the primary request storage area.

5. The request control device of claim 4, wherein
    the comparing means is further configured to determine if the incoming queue unit corresponds to the same message as a third queue unit in the primary request storage area if the secondary request storage area is empty; and
    the identifier setting means is further configured to set a save identifier of the third queue unit to indicate not to save the state associated with the message if the comparing means determines that the incoming queue unit and the third queue unit correspond to the same message.

6. The request control device of claim 5, wherein the combining means is configured to put the incoming queue unit in the secondary request storage area if (i) the incoming queue unit and the third queue unit correspond to the same message and (ii) the third queue unit is not at an end of the queue of the primary request storage area.

7. The request control device of claim 4, wherein
    the comparing means is further configured to determine if the incoming queue unit corresponds to the same message as a fourth queue unit at an end of the queue of the secondary request storage area when the secondary request storage area is not empty;
    the identifier setting means is further configured to set a save identifier of the fourth queue unit to indicate not to save the state associated with the message if the incoming queue unit and the fourth queue unit correspond to the same message; and
    the combining means is further configured to put the first queue unit in the secondary request storage area if the incoming queue unit and the fourth queue unit correspond to the same message.

8. The request control device of claim 3, wherein the secondary request storage area is a special purpose secondary request storage area corresponding to at least one basic hardware storage unit in the primary request storage area.

9. The request control device of claim 8, wherein
    the comparing means is further configured to determine if the incoming queue unit corresponds to the same message as a fifth queue unit in a basic hardware storage unit in the primary request storage area; and
    the combining means is further configured to put the incoming queue unit in the secondary request storage area corresponding to a basic hardware storage unit in which the fifth queue unit is located if the incoming queue unit and the fifth queue unit correspond to the same message.

10. The request control device of claim 9, wherein the identifier setting means is further configured to set a save identifier of the fifth queue unit to indicate not to save the state associated with the message if the secondary request storage area is empty when the incoming queue unit arrives at the request control device.

11. The request control device of claim 9, wherein the identifier setting means is further configured to set a save identifier of a queue unit at an end of a queue of the secondary request storage area to indicate not to save the state associated with the message if the secondary request storage area corresponding to the fifth queue unit is not empty when the incoming queue unit arrives at the request control device.

12. The request control device of claim 3, further comprising:
a counter configured to check whether a number of queue units that are continuously put in the secondary request storage area and correspond to the same message exceeds a first threshold value,
wherein the identifier setting means is further configured to set the save identifier of the queue unit that is pre-existing in the request storage module to indicate not to save the state associated with the message if the number does not exceed the first threshold value, and
wherein the combining means is further configured to put the incoming queue unit in the secondary request storage area if the number does not exceed the first threshold value.

13. The request control device of claim 3, wherein if the data structure of the queue units in the primary request storage area is not identical to the data structure of the queue units in the secondary request storage area, then, after formatting the incoming queue unit, the combining means puts the incoming queue unit in the secondary request storage area according to the data structure of the queue units in the secondary request storage area.

14. The request control device of claim 13, wherein if the incoming queue unit does not correspond to the same message as any of the queue units in the primary request storage area, then the combining means puts the incoming queue unit at an end of the queue of the primary request storage area.

15. A multiprocessor cooperation architecture comprising:
a request control means;
a request storage module, coupled to the request control means;
a general purpose processor, coupled to the request control means, for unpacking packets of a message received by the multiprocessor cooperation architecture into transformed message segments, for packaging the transformed message segments into queue units, and for placing the queue units into the request storage module;
a special purpose processor, coupled to the request storage module, for stateful processing of the queue units each time a queue unit is placed into the request storage module by the general purpose processor, wherein the special purpose processor saves and loads states associated with the message while processing the queue units; and
one or more memory storage locations,
wherein the request control means includes (i) a comparing means configured to determine if an incoming first queue unit corresponds to a same message as a queue unit that pre-exists in the request storage module and (ii) an identifier setting means configured to set a save identifier of the queue unit that pre-exists in the request storage module to indicate not to save a state associated with the message if the first queue unit corresponds to the same message as the queue unit that pre-exists in the request storage module;
wherein the special purpose processor includes an identifier reading means configured to determine whether to save the state associated with the message, after the queue unit that pre-exists in the request storage module is processed, according to the save identifier of the queue unit that pre-exists in the request storage module, and
wherein contents of the one or more memory storage locations is a state associated with processing of the message so that processing of the message can be resumed from a same point at a later time during state switching of the special purpose processor.

16. The multiprocessor cooperation architecture of claim 15, in which the queue unit has a data structure that comprises a first portion including a message ID for indicating the message to which the queue unit corresponds, a second portion including data to be processed or a pointer to the data, and a third portion including the save identifier.

17. The multiprocessor cooperation architecture of claim 16, in which the data structure of queue units in the primary request storage area comprises a quality of service control mark for guiding operation of the special purpose processor, and when the quality of the service control mark for a particular message remains unchanged, the combining means removes the quality of service control mark from the incoming queue unit prior to putting the incoming queue unit in the secondary request storage area.

18. A request control method comprising:
stateful processing of a plurality of messages, each message including a plurality of queue units, each message having a state associated with processing of the message, the state being dependent upon processing of the queue units of the corresponding message, each queue unit having a save identifier that indicates whether to save the state associated with processing of its corresponding message;
determining if a first queue unit incoming to a request control means corresponds to a same message as a queue unit that pre-exists in a request storage module; and
setting a save identifier of the queue unit that pre-exists in the request storage module to indicate not to save a state associated with the message if the first queue unit corresponds to the same message as the queue unit that pre-exists in the request storage module,
wherein contents of one or more memory storage locations is a state associated with processing of the message so that processing of the message can be resumed from a same point at a later time during state switching of the processor.

19. The request control method of claim 18, wherein
the step of determining if the first queue unit corresponds to the same message as a queue unit that pre-exists in the request storage module comprises determining if the first queue unit corresponds to the same message as a second queue unit at an end of a queue of a primary request storage area in the request storage module; and
the step of setting a save identifier of the queue unit that pre-exists in the request storage module to indicate not to save a state associated with the message comprises setting a save identifier of the second queue unit to indicate not to save the state associated with the message.

20. The request control method of claim 19, further comprising:
putting the first queue unit in a secondary request storage area of the request storage module.

21. The request control method of claim 20, wherein the secondary request storage area is shared by basic hardware storage units in the primary request storage area.

22. The request control method of claim 21, wherein
the step of determining if the first queue unit corresponds to the same message as the queue unit that pre-exists in the request storage module further comprises determining if the first queue unit corresponds to the same message as a third queue unit in the primary request storage area if the secondary request storage area is empty; and the step of setting a save identifier of the queue unit that pre-exists in the request storage module to indicate not to save a state associated with the message further comprises setting a save identifier of the third queue unit to indicate not to save the state associated with the message.

23. The request control method of claim 21, wherein
the step of determining if the first queue unit corresponds to the same message as a queue unit that pre-exists in the request storage module further comprises determining if the first queue unit corresponds to the same message as a fourth queue unit in an end of the queue of the secondary request storage area if the secondary request storage area is not empty; and the step of setting a save identifier of the queue unit that pre-exists in the request storage module to indicate not to save a state associated with the message comprises setting a save identifier of the fourth queue unit to indicate not to save the state associated with the message.

24. The request control method of claim 20, wherein
the step of determining if the first queue unit corresponds to the same message as a queue unit that pre-exists in the request storage module further comprises determining if the first queue unit corresponds to the same message as a fifth queue unit in a basic hardware storage unit in the primary request storage area; and the secondary request storage area is a special purpose secondary request area and corresponds to a basic hardware storage unit in which the fifth queue unit is located.

25. The request control method of claim 20, further comprising:

checking whether a number of queue units that are continuously put in a secondary request storage area and correspond to the same message exceeds a first threshold value, and setting the save identifier of the queue unit that has existed in the request storage module to indicate not to save the state associated with the message if the number does not exceed the first threshold value.

* * * * *